UNITED STATES PATENT OFFICE.

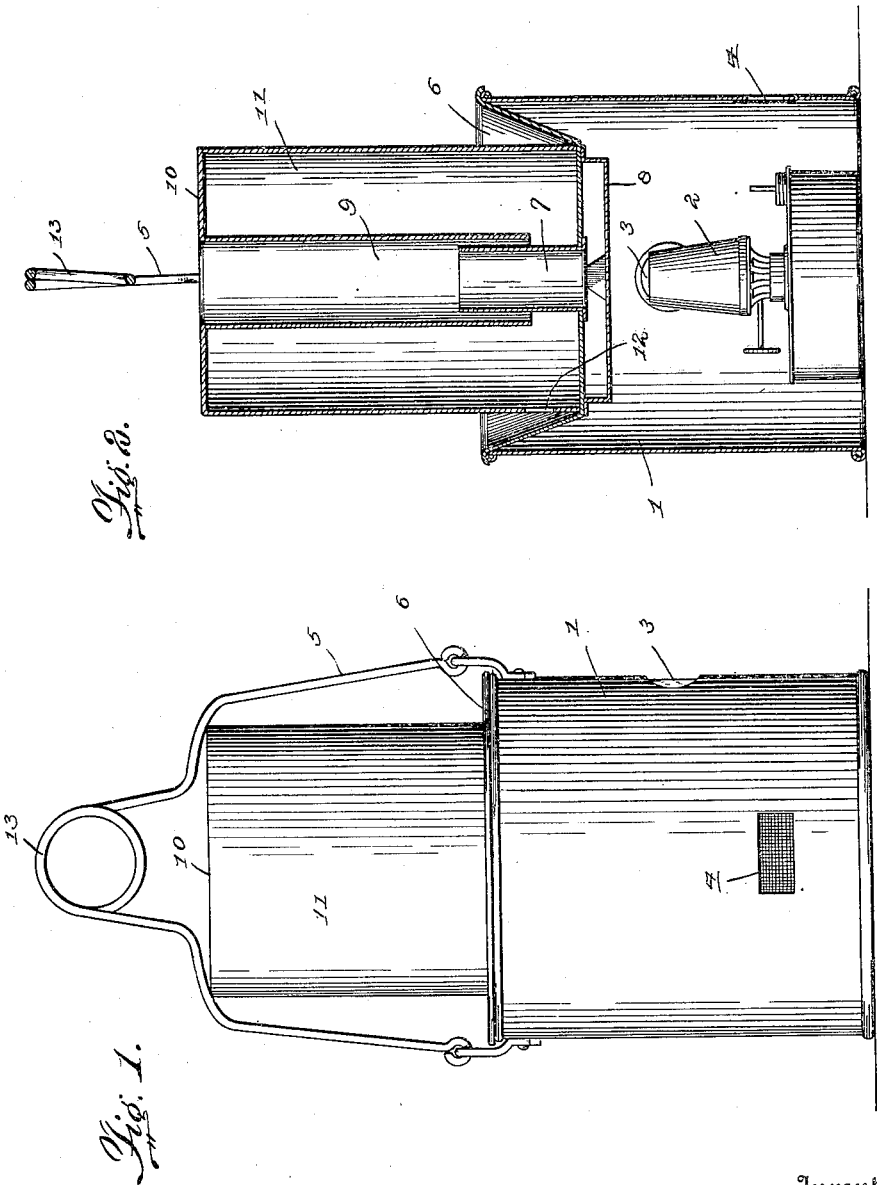

ROBERT S. BROOKS, OF MOUNT STERLING, ILLINOIS.

DRINKING-FOUNTAIN.

1,125,806.  Specification of Letters Patent.  Patented Jan. 19, 1915.

Application filed October 7, 1913. Serial No. 793,927.

*To all whom it may concern:*

Be it known that I, ROBERT S. BROOKS, a citizen of the United States, residing at Mount Sterling, in the county of Brown and State of Illinois, have invented new and useful Improvements in Drinking-Fountains, of which the following is a specification.

This invention relates to drinking fountains and more particularly to drinking fountains for chickens and other fowl, and the object of the invention is to provide a simple and efficient structure in which the water may be conveniently maintained at an even temperature during cold weather.

Further objects of the invention will appear as the following description is read in connection with the accompanying drawing, which forms a part of this application, and in which:—

Figure 1 is an elevation. Fig. 2 is a vertical sectional view.

Referring more particularly to the drawing, 1 represents a tubular support which is adapted to act as a shield for the heater 2 here shown in the form of a lamp. The support is provided with a sight opening 3 and with a screened vent 4 which permits sufficient ingress of air to supply the lamp. The upper end of the tubular support has secured thereto suitable pivoting ears to which are pivotally connected the opposite ends of a handle bail 5, the construction and purpose of which will be hereinafter described.

Seated upon the upper end of the support and depending into the same is a pan 6 adapted to receive and contain a predetermined amount of water. This pan is provided with a central venting tube or flue 7 which passes through the bottom and is guarded by means of the shield or deflector 8 which deflects the heat from the lamp or heater to the sides of the pan, as will be readily understood, the heat then passing between the shield and the bottom of the pan and out through the flue 7 into a flue 9 depending centrally from the top 10 of the reservoir 11. This reservoir seats in the pan and has its flue 9 surrounding the upper end of the flue 7.

In practice, the reservoir is inverted and filled with water and the pan then inverted on the reservoir. Both are then turned right side up, the water issuing from the reservoir into the pan through an aperture 12 formed in the lower side wall of said reservoir. Thus it will be seen that a trap is formed and only a certain amount of water may issue which is approximately sufficient to fill the pan. As the water is used by the fowls an additional supply issues from the reservoir and maintains a constant level in the pan.

The upper end of the bail is formed into a coil 13 and immediately below the same the legs of the bail are extended laterally so as to produce shoulders which lie over the upper end of the reservoir and hold the same in place. The coil allows the bail to be sprung over the receptacle and removed therefrom when it is desired to fill the reservoir.

What is claimed is:—

In a drinking fountain for poultry and the like, the combination with a tubular support, of a drinking pan mounted thereon, a reservoir mounted upon the drinking pan and communicating therewith, a bail connected to the support, and a coiled spring in the bail, said bail adapted to spring over the reservoir for holding the reservoir and pan upon the support.

In testimony whereof I affix my signature in presence of two witnesses.

ROBERT S. BROOKS.

Witnesses:
R. E. VANDEVENTER,
H. A. PERRY.

Copies of this patent may be obtained for five cents each, by addressing the "Commissioner of Patents, Washington, D. C."